Aug. 18, 1936.                C. G. BRIEL                2,051,161
              METHOD OF MAKING PHOTOGRAPHIC MATS
                      Filed March 19, 1932
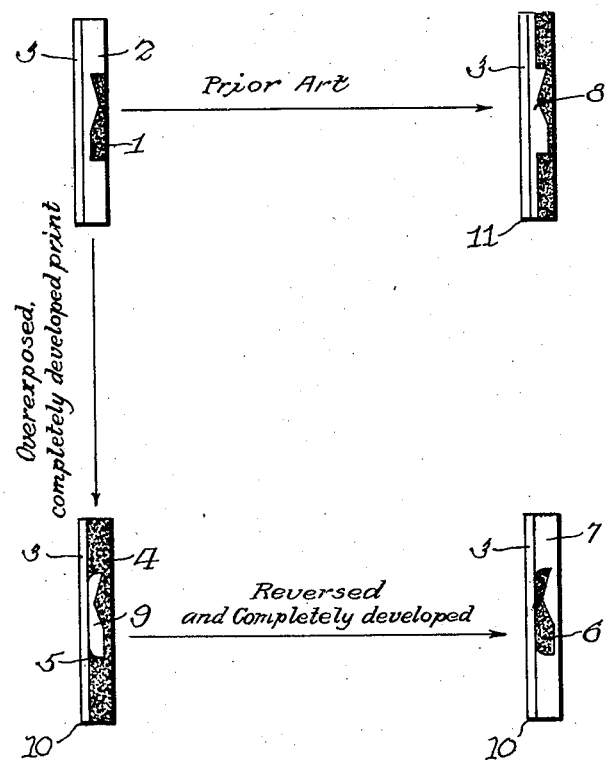
Inventor
Conrad G. Briel Patented Aug. 18, 1936

2,051,161

UNITED STATES PATENT OFFICE 2,051,161

METHOD OF MAKING PHOTOGRAPHIC MATS

Conrad G. Briel, Chicago, Ill., assignor to Cinema Development Company, Chicago, Ill., a corporation of Illinois Application March 19, 1932, Serial No. 599,941

3 Claims. (Cl. 95—5)

This invention relates to a method of making photographic mats for use in motion picture or still photography.

In particular, the invention has to do with a simple, rapid, inexpensive method of photographically preparing mats corresponding to given photographic images.

Unlike any of the prior methods of which I am aware, the method contemplated by this invention neither requires the tedious outlining of images by hand, the impracticability of which is immediately apparent when thought of in connection with the thousands of individual pictures that compose a reel of motion pictures, nor does the mat produced cover a larger area than that of the image used to begin with, as is the case in those methods employing over-exposure, over-development, intensification, dye-toning, etc., in which image spread is inherent. In composite photography image spread in mats is intolerable, for if a mat that has suffered image-spread blocks out a greater area of one component than the area of the other component, upon exposing to the second component and developing, a line or band in which the details of neither component exists will appear about the second component, thereby detracting from the value of the product because such halation or line is highly relevant to the fact that the picture is the result of composite photography. In the present method instead of taking, say a positive print of an object photographed before a non-actinic ground, exposing through said positive print onto a fresh film and treating this third film to produce a mat as in prior processes, I preferably expose a fresh actinic surface to the original negative sufficiently to render the sensitive material in the areas not occupied by the image completely developable whereupon I completely develop in a suitable developer solution. I then treat this film with a reversing solution such as a solution of potassium permanganate and sulphuric acid, decolorize said film by treating with a solution of acid sulphite, expose sufficiently to make all the remaining sensitive silver developable and finally develop. In making the first exposure I completely ignore any halation formed because such halation does not spread but recedes from the periphery when the final image is reversed, and, also, because the density of such halation is proportionally small compared with the density of the reversed image.

The manner in which this method is practiced is best understood from the following description of a preferred method which is illustrative of the invention but is not to be considered as a limitation thereof. To assist the comprehension of the following specific description, I refer to the accompanying drawing, in which:

The figure is a flow diagram illustrating the film at various stages of the process, and comparing it with the prior art.

In practicing this method, I first obtain a photographic image by exposing a fresh actinic surface to an object positioned before a non-actinic ground.

On development, the negative is provided with a silver image 1 on a clear transparent area 2. To make a corresponding mat, I then make a photographic impression through this negative on a fresh emulsion (positive print 10) sufficiently deep to render the non-image area completely developable, then deeply develop and so obtain a completely reduced area 4 about the positive image 9, disregarding halation 5. I now treat this film 10 with a solvent for silver such as a solution of potassium permanganate and sulphuric acid in order to remove all the metallic silver, thereby leaving a residual image of silver bromide and a surrounding clear area 7, this residual image of silver bromide being finally exposed to light and developed in order to blacken and thus make an opaque image 6. It is obvious that the halation 5 tends to form in an inward direction as regards the reverse image 6 and therefore causes no difficulty in the resulting mat since difficulty could only arise if the halation formed outwardly and caused the image to spread.

Now if a mask produced in this way is used in certain methods of composite photography, and according to said methods is interposed between a background action and a fresh actinic surface (or is used as a travelling mat), a portion of the fresh actinic surface exactly equal in size and shape to image 1, will remain unexposed, after which the details of an identic image 8 of a second positive print 11 also made from the negative, may be impressed upon this unexposed area, and the finally developed composite will show neither lapping nor separation of details at the line of junction between the two components forming the composite picture to be produced. As an alternative method, if it is desired to obtain greater differentiation between mat and non-image area, the mat as finally obtained may again be subjected to the same steps which have been described in connection with its making, that is to say, it may be used as the negative, from which another positive print 10 may be made and treated as described to produce the image 6. Such additional treatment has the effect of increasing the contrast between the mat and the non-image area and may be repeated as often as desired.

As a further alternative method, the reduced area 4 may be treated with a suitable bleach, such as a solution of potassium ferricyanide and image 6 thereafter may be exposed to light and developed sufficiently to make it opaque. This bleached portion will have a density permitting the passage therethrough of the image details of the background action or component and will not interfere with the proper exposure of the latter to the fresh actinic surface.

In the drawing the photographic emulsion is shown relatively thicker in cross-section than the celluloid base 3 contrary to the actual proportions generally found in the ordinary photographic film; but it will be understood that this showing is made for the purpose of illustration only, that these proportions may vary, and that the proportions of the standard photographic film are also contemplated.

Other advantages and objects will be apparent to those skilled in the art, and therefore I do not wish to be limited to the exact details or steps described and shown herein, since many modifications are possible without departing from the spirit and scope of the invention.

I claim:

1. The method of producing a photographic mat that includes producing a negative of an object before a non-actinic ground, printing a sensitized film through the negative until it is rendered completely developable at the light exposed portions, completely developing these portions, clearing these portions, and exposing and completely developing the remaining silver halide.

2. The method of producing a photographic mat that includes printing a sensitized film through a negative of an object before a non-actinic ground until it is rendered completely developable at the light exposed portions, completely developing these portions, clearing these portions, and exposing and completely developing the remaining silver halide.

3. The method of producing a photographic mat that includes printing a sensitized film through a film having an image area and a clear non-image area until it is rendered completely developable at the light exposed portions, completely developing these portions, clearing these portions, and exposing and substantially completely developing the remaining silver halide.

CONRAD G. BRIEL.